June 7, 1966  T. DEIGHTON  3,255,089
INTEGRAL NUCLEAR REACTOR-HEAT EXCHANGER SYSTEM
Filed Sept. 26, 1963  3 Sheets-Sheet 1

INVENTOR
Thomas Deighton
BY
ATTORNEY

Fig. 2.
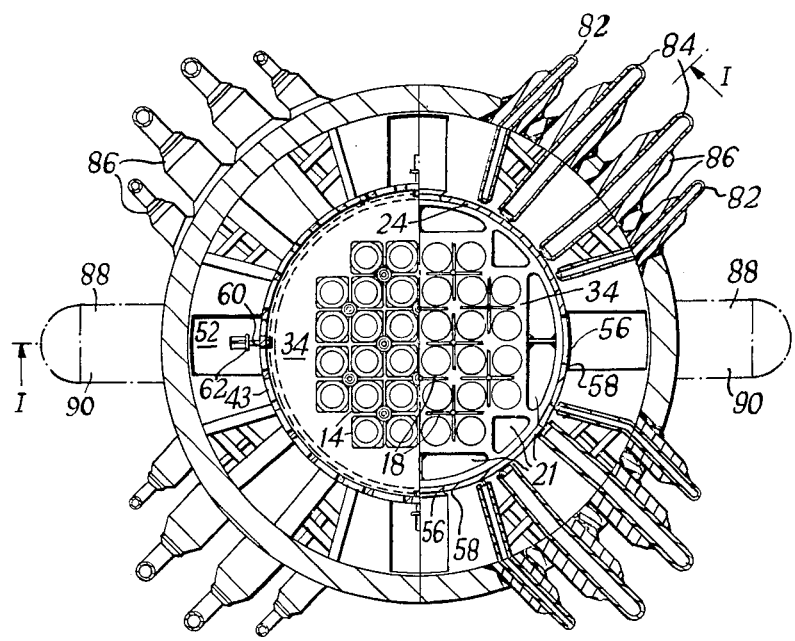
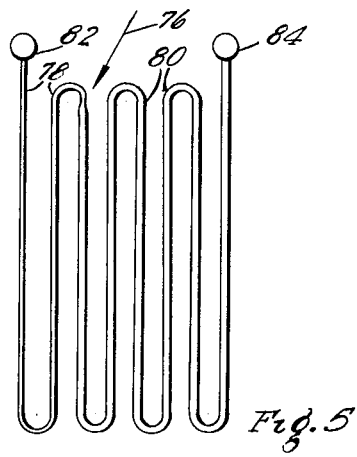
Fig. 5

June 7, 1966  T. DEIGHTON  3,255,089
INTEGRAL NUCLEAR REACTOR-HEAT EXCHANGER SYSTEM
Filed Sept. 26, 1963  3 Sheets-Sheet 3

3,255,089
INTEGRAL NUCLEAR REACTOR-HEAT
EXCHANGER SYSTEM
Thomas Deighton, London, England, assignor to Babcock & Wilcox, Limited, London, England, a company of Great Britain
Filed Sept. 26, 1963, Ser. No. 311,802
Claims priority, application Great Britain, Sept. 28, 1962, 36,957/62
11 Claims. (Cl. 176—61)

This invention relates to liquid-cooled and moderated reactors and more particularly to liquid-cooled and moderated integral reactors in which the liquid is contained in a reactor pressure vessel under pressure together with nuclear fuel elements, heat exchanger banks and circulating pumps.

In some designs it is usual to mount the circulating pumps on a lid to the reactor pressure vessel such that they receive the primary coolant direct from the nuclear fuel elements. This has the drawback that, when the temperature of the primary coolant is raised to a temperature approaching saturation temperature, cavitation is likely to occur in the circulating pumps. It is desirable, therefore, to mount the pumps so that they receive primary coolant on discharge from the heat exchanger banks and thus at the coolest point in the circulatory system. Such a position is advantageously the base of the reactor pressure vessel. Difficulties, however, are encountered with such an arrangement when it is desired to shut-down the reactor and remove or replace the circulating pumps. Due to the production of decay heat in the nuclear fuel elements following shutting-down of the reactor, the danger arises of the fuel elements melting unless cooling of the fuel elements is continuously effected. It is, therefore, not possible to drain the reactor pressure vessel in order to remove or replace the circulating pumps except during refueling since it is necessary to use the primary coolant to extract the decay heat from the fuel elements.

According to the present invention, a liquid-cooled and moderated nuclear reactor includes a reactor vessel enclosing nuclear fuel elements positioned within a fuel element containing vessel arranged to retain a body of liquid in which the nuclear fuel elements are submerged upon draining the remainder of the reactor vessel and circulating means for effecting circulation of the liquid over the nuclear fuel elements and a heat exchanger situated within the reactor vessel externally of the fuel element containing vessel.

The invention also includes a liquid-cooled and moderated nuclear reactor having a reactor vessel enclosing nuclear fuel elements positioned within a fuel element containing vessel contained within, but withdrawable together with the nuclear fuel elements from, the reactor vessel and adapted to maintain a head of liquid covering the nuclear fuel elements when withdrawn from the reactor vessel and circulating means for effecting circulation of the liquid over the nuclear fuel elements and a heat exchanger externally of the fuel elements containing vessel.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there has been illustrated and described preferred embodiments of the invention.

Of the drawings:
FIG. 1 is a cross-sectional elevation of a liquid-cooled and moderated nuclear reactor, taken on the line I—I of FIG. 2, parts of a fuel element and associated tube lengths also being shown in section and other fuel elements and tube lengths being omitted;

FIG. 2 is a cross-sectional view taken on the line II—II of FIG. 1, insulation surrounding the reactor being omitted for the sake of clarity;

FIG. 5 is an enlarged view of one of the passes of the bank of tube lengths shown in FIG. 3.

Figure 1:
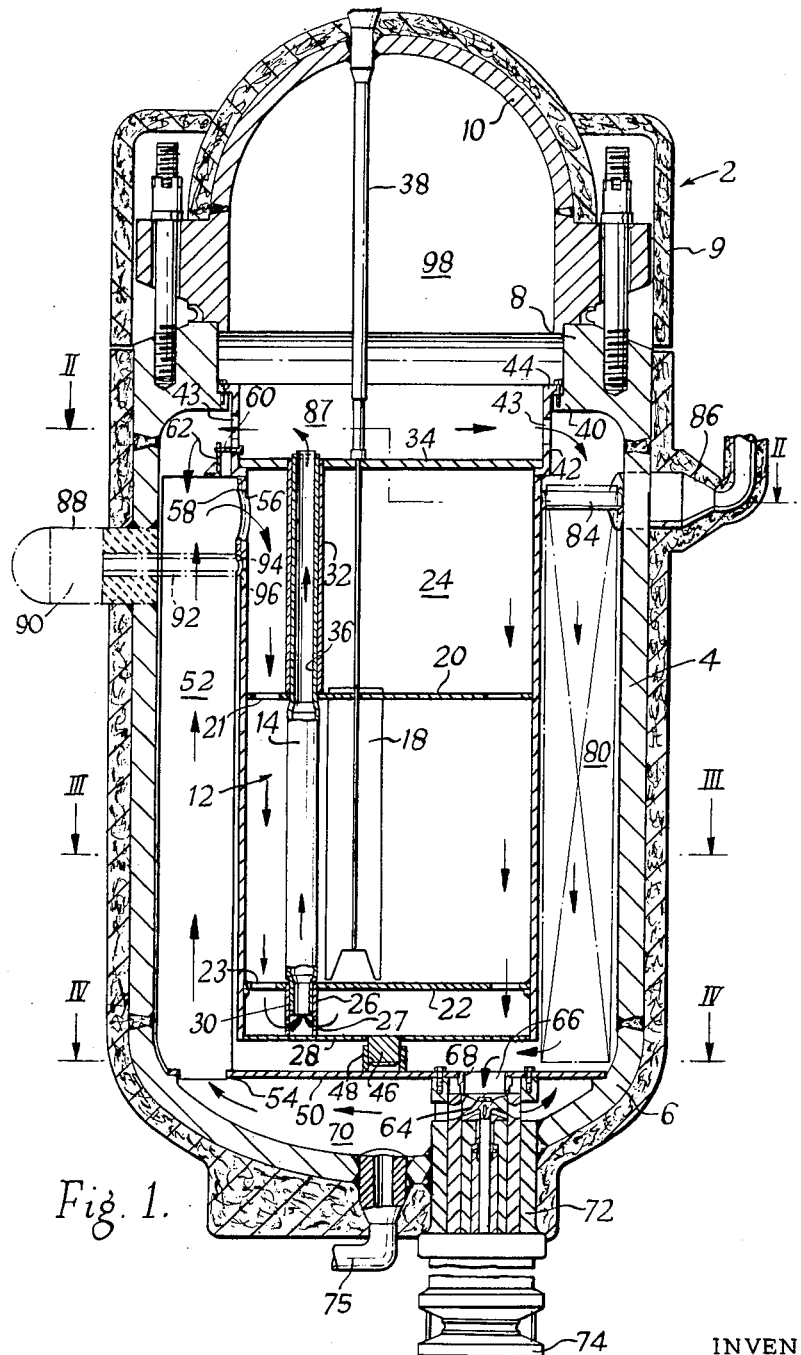
Figure 3:
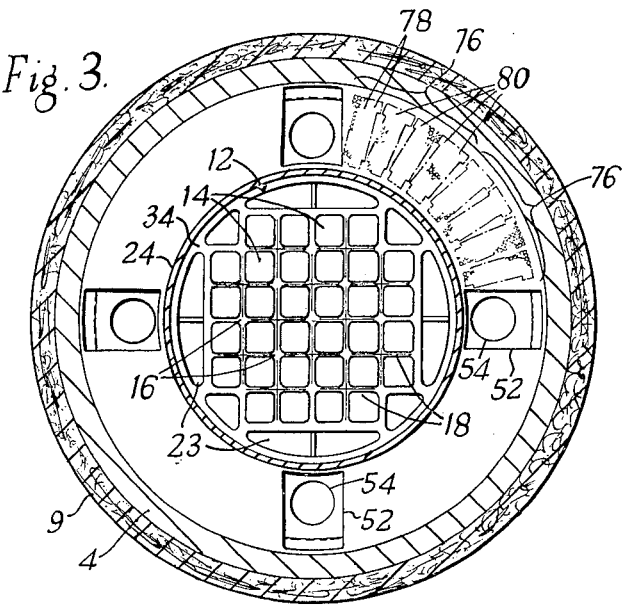
FIG. 3 is a cross-sectional view taken on the line III—III of FIG. 1, only one group of heat exchange tubes being shown for the sake of clarity.
Figure 4:
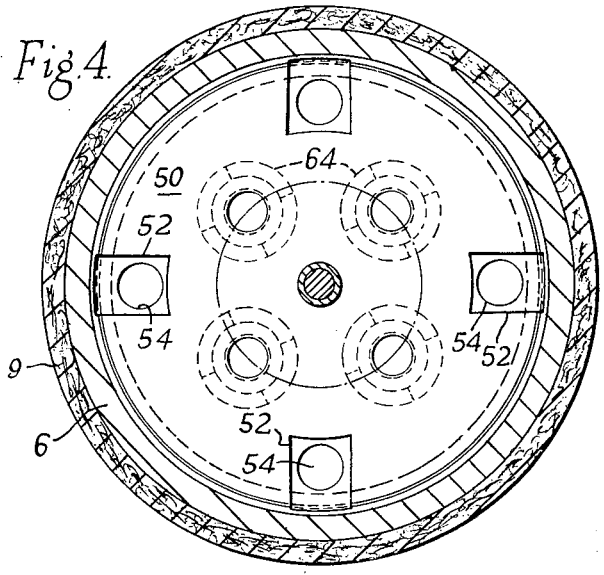
FIG. 4 is a cross-sectional view taken on the line IV—IV of FIG. 1.

Referring to the drawings, there is shown a pressurized water reactor 2 having a reactor vessel 4 of upright cylindrical form with a domed end 6 at the base and an inwardly extending flange 8 at the upper end thereof. A domed lid 10 is bolted and seal welded to the flange 8. A layer of fiber glass insulation 9 is positioned around the reactor.

A fuel assembly 12 includes thirty-two fuel elements 14 of square cross-section spaced apart to provide channels 16 for the flow of water therebetween and twelve control rods 18 of cruciform cross-section interposed between the fuel elements 14. The fuel elements 14 are positioned between upper and lower support grids 20, 22 in the lower half of a containing vessel 24 which also serves as a thermal neutron shield. The upper and lower support grids 20, 22 are formed respectively with apertures 21, 23 adjacent the periphery thereof to permit the passage of cooling water. Short tube lengths 26 provided with apertures 27 extend between the lower support grid 22 and a base 28 of the containing vessel 24 in register with end portions 30 of the fuel elements and conduct coolant to the fuel elements. Tube lengths 32 extend over the upper half of the containing vessel between the upper support grid 20 and a tube plate 34 closing the vessel, the tube lengths 32 registering with apertures in the tube plate 34 and surrounding upper extensions 36 of the ends of the fuel elements 14. Drive means 38 for the control rods 18 extend through the lid 10 of the reactor vessel and the tube plate 34 and are arranged to raise the control rods 18 from a position between the fuel elements 14 in the lower half of the containing vessel 24 to a position in the upper half of the containing vessel or lower the rods from the upper half of the containing vessel to between the fuel elements.

The containing vessel 24 is supported from a shoulder 40 formed on the flange 8 of the reactor vessel by means of an upper extension 42 welded to the main part of the containing vessel, formed with apertures 43 and having a flange 44 resting on and bolted to the shoulder 40. The base 28 of the containing vessel 24 is located by a lug 46 on the base coacting with a socket 48 formed on a support plate 50 seating on, and bolted to, the base 6 of the reactor vessel 4. Four, equiangularly spaced ducts 52 connect apertures 54 in the support plate 50 with apertures 56 in the upper half of the containing vessel 24, resilient stainless steel seals 58 being positioned between the ducts 52 and the containing vessel 24 around the apertures 56. The ducts 52 seat on the apertures 54 in the support plate 50 and are urged against the seals 58 by means of bolts 60 extending through the upper extension 42 of the containing vessel 24 and coacting with lugs 62 provided on the ducts 52.

Four centrifugal pumps 64 are positioned in the base 6 of the reactor vessel 4 with the inlets 66 thereto connected to apertures 68 in the support plate 50 and discharging to the space 70 between the support plate 50 and the base 6. The pumps 64 are of cartridge design, being removable as a whole, and extend through pump ducts 72 passing through the base, the ends of the pump ducts 72 being closed by covers 74 bolted and seal welded to the ducts, to allow for removal of a pump by removing the cover and sliding the pump from the respective pump duct. Also positioned in the base 6 is a drain nipple 75 provided with a valve (not shown) to enable the reactor vessel 4 to be drained.

Eight banks 76 of heat exchanger tubes are positioned between the wall of the reactor vessel 4 and the wall of the containing vessel 24 intermediate the ducts 52. Each bank 76 includes eight sinuous, nested, tube lengths arranged in eight upright passes connected together by return bends, the first two passes 78 being of somewhat smaller diameter tube than the subsequent six passes 80, see FIG. 5. The first and last passes of each bank are respectively connected to inlet and outlet headers 82, 84, the inlet headers being of somewhat smaller diameter than the outlet headers. Extensions of the headers pass through thermal sleeves 86 extending laterally through the wall of the reactor vessel 4 below the level of the flange 8.

In operation, the reactor vessel 4 is filled with water to the level of the flange 8, and the water is circulated by the pumps 64 upwardly through the ducts 52 through the apertures 56, to the upper half of the containing vessel 24 whence it flows downwardly through the apertures 21 in the upper support grid 20, between the fuel elements 14 and the wall of the containing vessel 24 and through the apertures 23 in the lower support grid 22. The water next flows through the apertures 27 and the short tube lengths 26, and upwardly through the fuel elements 14, extracting heat therefrom, and then flows through the extensions 36 of the fuel elements to be discharged to the free space 87 above the tube plate 34. From the free space 87 the water flows downwardly through the apertures 43 in the extension 42 of the containing vessel, over the tube banks 76, at which heat is transferred to secondary coolant flowing through the banks, and is returned to the inlets 66 of the pumps 64.

Should it become necessary to inspect or repair one of the pumps 64, the control rods 18 are lowered between the fuel elements 14 and the water is drained from the reactor vessel 4 through the drain nipple 75. Since the containing vessel 24 is fluid-tight up to the level of the apertures 56 in the upper half of the containing vessel, a substantial body of water is maintained in the containing vessel covering the fuel elements 14 and circulates in the containing vessel absorbing the decay heat produced by the fuel elements. The decay heat may be dissipated by permitting the water to boil. The reactor vessel 4, having been drained, the pump 64 may be withdrawn, inspected and repaired or replaced as may be necessary. After installation of the repaired pump or a replacement pump, the reactor vessel may be refilled and normal operation resumed.

Should it become necessary to replace a part of a heat exchanger bank 76, the reactor vessel 4 is drained, as described above, the lid 10 is removed and the containing vessel 24, together with the fuel elements, control rods and residual water, removed and placed in a suitable coffin. The connections of the faulty tube bank are then severed, the bank is moved laterally into the central portion of the reactor vessel 4, normally occupied by the containing vessel, and is removed through the aperture defined by the flange 8, a replacement tube bank is inserted, the connections are remade, the containing vessel 24 is replaced, the reactor vessel 4 is refilled and normal operation is resumed.

In an alternative arrangement, auxiliary cooling means may be provided to extract heat from the water in the containing vessel during inspection or repair of one of the pumps 64. Thus as is shown in chain dotted lines in FIGS. 1 and 2, two auxiliary cooling connections 88 are positioned on opposite sides of the reactor vessel 4, each connection including a junction piece 90 welded into the wall of the reactor vessel 4, arranged to be connected respectively with an inlet to or an outlet from an auxiliary cooling system (not shown), and a tube 92 threaded into the junction piece penetrating the respective duct 52 in register with an aperture 94 in the containing vessel 24, a resilient stainless steel seal 96 being positioned between the duct and the containing vessel around the aperture 94. In operation, following lowering of the control rods 18 and draining of the reactor vessel through the drain nipple 75, the auxiliary cooling system is connected with the junction pieces 90, and water is circulated in through one junction piece and out through the other to extract decay heat from the fuel elements 14. The pump 64 may then be withdrawn, inspected and repaired or replaced, as may be necessary. After installation of the repaired pump or a replacement pump, the auxiliary cooling system is disconnected from the junction pieces, the reactor vessel 4 is refilled and normal operation is resumed. It will be appreciated that since the tubes 92 are jointed to the containing vessel 24 by means of the resilient stainless steel seals 96, removal of the containing vessel from the reactor vessel, when required, is not impeded.

It will be appreciated that the removable containing vessel 24 affords a convenient means for rapidly refueling the reactor 2, the containing vessel containing the spent fuel elements being removed and placed in a suitable coffin for subsequent processing and a replacement containing vessel together with fresh fuel elements and control rods being inserted in the reactor vessel.

It will also be appreciated that by positioning the secondary coolant connections in the side wall of the reactor vessel rather than through the lid, as has been the practice hitherto, a smaller diameter lid may be used, and the necessity of cutting the connections each time the lid is removed is avoided.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A liquid-cooled and moderated nuclear reactor including a reactor vessel, a fuel element containing vessel closed at its lower end and disposed within and spaced from said reactor vessel, a plurality of nuclear fuel elements positioned and supported within said fuel element containing vessel, said fuel element containing vessel including its nuclear fuel elements withdrawable as a unit from said reactor vessel, an inlet opening in said fuel element containing vessel, an outlet opening in said fuel element containing vessel, said inlet and outlet openings spaced above said nuclear fuel elements for passing moderator-coolant liquid through the fuel element containing vessel, a heat exchanger situated within the reactor vessel and positioned outwardly from the fuel element containing vessel, and circulating means in communication with the reactor vessel for effecting circulation of the moderator-coolant liquid through the fuel element containing vessel over the nuclear fuel elements and through the heat exchanger whereby at the discontinuation of circulation and draining of the reactor vessel a liquid level is maintained within the fuel element containing vessel above the nuclear fuel elements.

2. A liquid-cooled and moderated nuclear reactor including a reactor vessel, an undrainable fuel element containing vessel closed at its lower end and disposed within and spaced from said reactor vessel, a plurality of nuclear fuel elements positioned and suported within said fuel element containing vessel, said fuel element containing vessel including its nuclear fuel elements withdrawable as a unit from said reactor vessel, an inlet opening in said fuel element containing vessel, an outlet opening in said fuel element containing vessel, said inlet and outlet spaced above said nuclear fuel elements for passing moderator-coolant liquid through the fuel element containing vessel, a heat exchanger situated within the reactor vessel and positioned outwardly from the fuel element containing vessel, and circulating means in communication with the reactor vessel for effecting circulation of the moderator-coolant liquid over the nuclear fuel elements and the heat exchanger whereby at the discontinuation of circulation and draining of the reactor vessel a liquid level is maintained within the fuel element containing vessel above the nuclear fuel elements, said level being maintained when the fuel element containing vessel is removed from the reactor vessel.

3. A liquid-cooled and moderated nuclear reactor as claimed in claim 2, wherein the circulating means are positioned at the base of the reactor vessel.

4. A liquid-cooled and moderated nuclear reactor as claimed in claim 3 wherein ducts are provided extending through the base of the reactor vessel, and said circulating means disposed within and removable through said ducts.

5. A liquid-cooled and moderated nuclear reactor as claimed in claim 2, wherein the heat exchanger is arranged in banks positioned in the annular space between the wall of the reactor vessel and the wall of the containing vessel, and ducts connecting the outlet side of the circulating means to apertures in an upper part of the containing vessel are interposed between the heat exchanger banks.

6. A liquid-cooled and moderated nuclear reactor as claimed in claim 5, wherein the path of the liquid coolant extends downwardly from the said apertures and between the nuclear fuel elements and the inner wall of the containing vessel through a lower support grid and upwardly through the nuclear fuel elements.

7. A liquid-cooled and moderated nuclear reactor as claimed in claim 6, wherein resilient sealing means are provided between the ducts and the apertures.

8. A liquid-cooled and moderated, nuclear reactor as claimed in claim 7, wherein biasing means operable externally of the containing vessel are provided to urge the ducts towards the containment vessel adjacent the apertures and compress the resilient sealing means.

9. A liquid-cooled and moderated nuclear reactor as claimed in claim 2, wherein the reactor vsesel is of closed cylindrical form having a main part provided at one end with an aperture of diameter not substantially greater than that of the containing vessel, through which the containing vessel is removable, and closed by a lid, the main part containing the containing vessel and heat exchanger banks arranged to transfer heat from the liquid to a secondary coolant supplied to and discharged from the banks through secondary colant ducts extending through the wall of the main part.

10. A liquid-cooled and moderated nuclear reactor as claimed in claim 9, wherein the main part of the reactor vessel is flanged inwardly at the aperture.

11. A liquid-cooled and moderated nuclear reactor as claimed in claim 10, wherein the heat exchanger banks are formed of tubes arranged in sinuous passes the initial passes thereof being of tubes of lesser diameter than the diameter of the tube of subsequent passes and connected to a secondary coolant inlet duct of lesser diameter than a secondary coolant outlet duct connected to the subsequent passes, and each bank of the heat exchanger banks is removable and replaceable through the aperture following removal of the containing vessel and severing of connections to the said bank.

References Cited by the Examiner

UNITED STATES PATENTS

| 2,926,127 | 2/1960 | McCorkle | 176—64 |
| 3,012,547 | 12/1961 | Ostergaard et al. | 176—53 |
| 3,105,036 | 9/1963 | Puechl | 176—61 |
| 3,108,937 | 10/1963 | Kumpf et al. | 176—64 |
| 3,127,322 | 3/1964 | Dodd | 176—60 |

FOREIGN PATENTS

| 1,265,483 | 5/1961 | France. |
| 800,385 | 8/1958 | Great Britain. |
| 911,135 | 11/1962 | Great Britain. |

LEON D. ROSDOL, *Primary Examiner.*

REUBEN EPSTEIN, CARL D. QUARFORTH,
*Examiners.*

L. D. RUTLEDGE, *Assistant Examiner.*